(12) United States Patent  
Ruehle

(10) Patent No.: US 9,177,253 B2  
(45) Date of Patent: Nov. 3, 2015

(54) SYSTEM AND METHOD FOR DFA-NFA SPLITTING

(71) Applicant: Intel Corporation, Santa Clara, CA (US)

(72) Inventor: Michael Ruehle, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 13/755,252

(22) Filed: Jan. 31, 2013

(65) Prior Publication Data

US 2014/0214749 A1 Jul. 31, 2014

(51) Int. Cl.
*G06N 5/02* (2006.01)

(52) U.S. Cl.
CPC ........................................ *G06N 5/025* (2013.01)

(58) Field of Classification Search
CPC ...................................................... G06N 5/025
See application file for complete search history.

(56) References Cited

U.S. PATENT DOCUMENTS

2012/0011094 A1* 1/2012 Yamagaki ........................ 706/45
2012/0331554 A1* 12/2012 Goyal et al. ..................... 726/23

OTHER PUBLICATIONS

Suejb Memeti, "Automatic Java Code Generator for Regular Expression and Finite Automata", published by Linneaeus Univeristy, Vaxjo, SE, for Degree Project, May 2012, pp. 1-47.*

Michela Becchi, Charlie Wiseman, Patrick Crowley, "Evaluating Regular Expression Matching Engines on Network and General Purpose Processors", 5th ACM/IEEE Symposium on Architectures for Networking and Communications Systems (ANCS'09), Oct. 2009, pp. 30-39.*

Michela Becchi, Mark Franklin, and Patrick Crowley, "A Workload for Evaluating Deep Packet Inspection Architectures", Workload Characterization, 2008. IISWC 2008. IEEE International Symposium on, Oct. 2008, pp. 79-89.*

Michela Becci, Patrick Crowley, "A Hybrid Finite Automaton for Practical Deep Packet Inspection", CoNEXT '07 Proceedings of the 2007 ACM CoNEXT conference, Dec. 2007, pp. 1-12.*

* cited by examiner

*Primary Examiner* — Kakali Chaki
*Assistant Examiner* — Walter Hanchak
(74) *Attorney, Agent, or Firm* — Barnes & Thornburg LLP

(57) ABSTRACT

Cost factors are utilized and may be estimated to determine split points in a DFA-NFA hybrid. The cost factors may comprise NFA start states, DFA backup factor, DFA-NFA token frequency, DFA steps to match, and NFA states to match. Other cost factors may be used as necessary. The cost factors are multiplied by tunable coefficients and summed. NFA states at minimum cost points are determined for entrance states in the NFA. A DFA is compiled from the entrance paths to the entrance states. NFA states and transitions needed only to reach entrance states may be deleted and all remaining NFA states are made available for execution by the NFA engine. An NFA representation of an NFA is examined by bounded depth-first recursion from each start state.

9 Claims, 5 Drawing Sheets

REGULAR
EXPRESSION: /[abcd]*[abef][aceg]h/ ~ 110

NFA: ~ 120

DFA: ~ 130

SYSTEM AND METHOD FOR DFA-NFA SPLITTING

BACKGROUND OF THE INVENTION

With the maturation of computer and networking technology, the volume and types of data transmitted on the various networks have grown considerably. For example, symbols in various formats may be used to represent data. These symbols may be in textual forms, such as ASCII, EBCDIC, 8-bit character sets or Unicode multi-byte characters, for example. Data may also be stored and transmitted in specialized binary formats representing executable code, sound, images, and video, for example. Along with the growth in the volume and types of data used in network communications, a need to process, understand, and transform the data has also increased. For example, the World Wide Web and the Internet comprise thousands of gateways, routers, switches, bridges and hubs that interconnect millions of computers. Information is exchanged using numerous high level protocols like SMTP, MIME, HTTP and FTP on top of low level protocols like TCP, IP or MAP. Further, instructions in other languages may be included with these standards, such as Java and Visual Basic. There are numerous instances when information may be interpreted to make routing decisions. In an attempt to reduce the complexity associated with routing decisions, it is common for protocols to be organized in a matter resulting in protocol specific headers and unrestricted payloads. Subdivision of the packet information into packets and providing each packet with a header is also common at the lowest level. This enables the routing information to be at a fixed location. With the increasing nature of the transmission of information, there is an increasing need to be able to identify the contents and nature of the information as it travels across servers and networks. Once information arrives at a server, having gone through all of the routing, processing and filtering along the way, it is typically further processed. This further processing necessarily needs to be high speed in nature. The first processing step that is typically required by protocols, filtering operations, and document type handlers is to organize sequences of symbols into meaningful, application specific classifications. Different applications use different terminology to describe this process. Text oriented applications typically call this type of processing lexical analysis. Other applications that handle non-text or mixed data types call the process pattern matching.

SUMMARY OF THE INVENTION

An embodiment of the invention may therefore comprise a method of splitting an automaton into a DFA portion and an NFA portion, the method comprising compiling a ruleset into an NFA representation, analyzing the NFA to determine entrance paths for matching by a DFA engine and tail portions for matching by an NFA engine, the entrance paths and tail portions covering the whole NFA, and compiling the entrance paths into a DFA for execution by a DFA engine, wherein accepting states of the DFA are configured to signal from the DFA engine to an NFA engine to activate associated tail portion entrance states inside the NFA engine, wherein the step of analyzing comprises evaluating a cost function, said cost function comprising a plurality of factors.

An embodiment of the invention may further comprise a system for splitting an automaton into a DFA portion and an NFA portion, comprising a DFA engine enabled to find matches to rules, an NFA engine, an NFA compiler enabled to compile a ruleset into an NFA representation, the compiler comprising a recursive entrance search function which is callable on each NFA start state to select entrance states and generate an entrance ruleset, and a DFA compiler enabled to compile the entrance ruleset into a DFA with instructions in an instruction format usable by the DFA engine.

An embodiment of the invention may further comprise a method of matching a ruleset in a DFA engine and an NFA engine, comprising generating an NFA with an NFA compiler from the ruleset, employing an entrance search function to select entrance states and generate an entrance ruleset, compiling the entrance ruleset into a set of DFA instructions for the DFA engine, generating NFA instructions for the NFA engine from the NFA states reachable from entrance states, executing the DFA instructions in the DFA engine, signaling entrance matches from the DFA engine to the NFA engine, and executing the NFA instructions in the NFA engine.

DETAILED DESCRIPTION OF THE EMBODIMENTS

To find matches to regular expressions or similar pattern matching rifles within a symbol stream, two main types of state machines may be constructed, nondeterministic and deterministic finite automata (NFAs and DFAs). Abstractly, an NFA or DFA is a directed graph, in which each graph vertex is a state and each graph edge is labeled with a class of input symbols that it accepts in order to make a transition from a source state to a destination state on that symbol class. The defining difference between NFAs and DFAs is that any two out-transitions from a DFA state must have non-intersecting symbol classes, whereas a single NFA state may have multiple out-transitions labeled with classes containing the same symbol.

Figure 1:
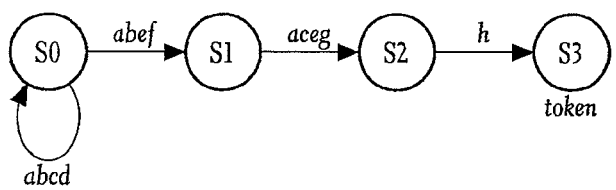
FIG. 1 illustrates a sample regular expression and a corresponding NFA and DFA.
Figure 1:
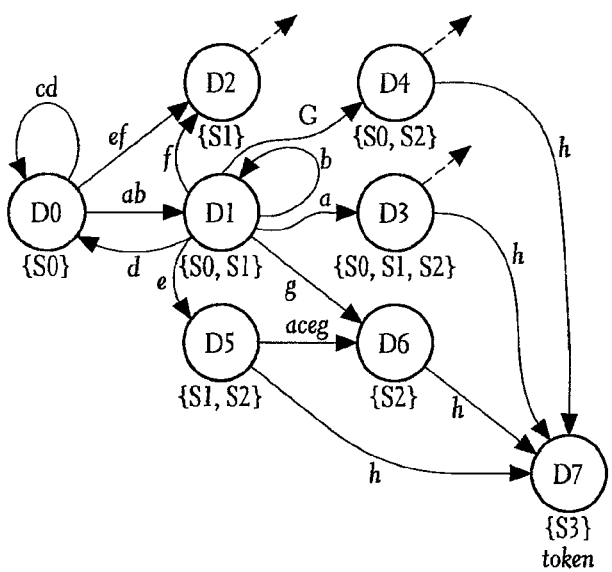

FIG. 1 illustrates a sample regular expression 110, a corresponding NFA 120 and DFA 130. In the embodiment of FIG. 1, the regular expression 110 defines search criteria that will match input data that begins with any number of characters from the character class [abcd], followed by a single character from the character class [abef], followed by a single character from the character class [aceg], followed by the character 'h'. thus, the regular expression comprises a spin expression, e.g., [abcd]*, where the '*' indicates that any number of the preceding character class matches the constraint, that results in a DFA 130 with many more states than the corresponding NFA 120. In the embodiment of FIG. 1, the input streams comprising the characters "bach" and "bababbbbaaaaddddach", for example, would each match the regular expression, while the characters "ebach" and "back", for example, would not match the regular expression.

The exemplary NFA 120 comprises a state S0 that either loops to itself upon receiving a character from the character class [abcd] or transitions to a state S1 upon receiving a character from the character class [abef]. The multiple possible transitions from state S1 of the NFA 120 upon receiving characters 'a' or 'b' illustrate the nondeterminism of the NFA 120. From state S1, the state machine transitions to state S2 upon receiving a character from the character class [aceg], and becomes inactive in response to receiving any other characters. Finally, from state S2, the state machine transitions to state S3 upon receiving the character 'h', and becomes inactive in response to receiving any other character. In one embodiment, the state S3 may be associated with an output action, such as outputting a token indicating a match of the regular expression.

U.S. patent application Ser. No. 13/684,922, by Ruehle, titled, "DFA-NFA Hybrid", describes a hybrid NFA-DFA engine and methodology. This application is specifically incorporated herein, by reference for all that it discloses and teaches. A hybrid, HFA, can be used to draw on the strengths of each type of automata to compensate for possible weaknesses of the other type. The HFA engine comprises an NFA engine and a DFA engine, each of which may be implemented in hardware or software. The embodiment may comprise a multi-threaded hardware DFA engine and a hardware dynamically reconfigurable NFA cell array (in accordance with U.S. Pat. No. 7,899,904 which is specifically incorporated herein by reference for all that it discloses and teaches). The DFA and NFA engines communicate to cooperatively find rule matches in a symbol stream. The rules are not simply divided between DFA and NFA engines. Cooperation occurs within the matching process for each rule. A typical rule has a beginning or entrance fragment matched by the DFA engine, which then signals to the NFA engine indicating an entrance NFA state to be activated. The NFA can then match the remainder, or tail, of the rule. For simple rules, the split between DFA and NFA can be understood at the rule level, with a left portion of the rule being the DFA entrance and the remaining right portion being the NFA tail.

Figure 2:
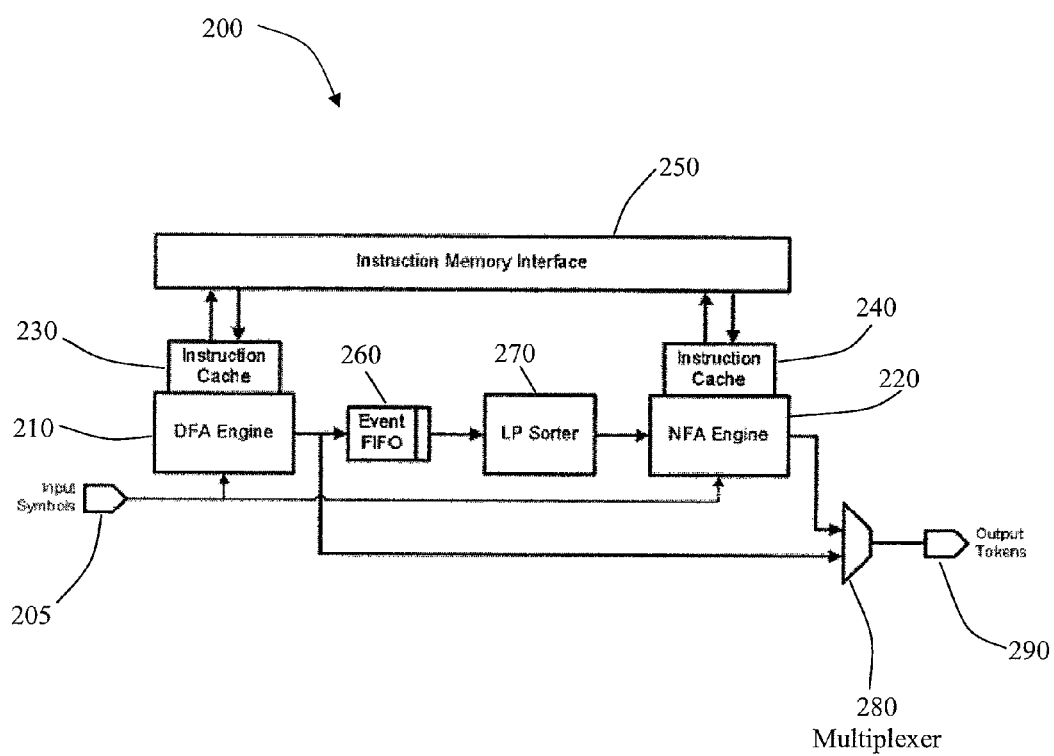
FIG. 2 is a block diagram of a DFA-NFA hybrid.

FIG. 2 is a block diagram of an embodiment of the invention. A hybrid architecture 200 comprises a DFA engine 210 which receives input symbols 205 from an input stream (not shown). Instructions for the DFA engine 210 are accessed via an instruction cache 230. The instruction cache 230 may be an L1 cache. The instruction cache 230 in turn receives/accesses instructions from an instruction memory (not shown) via an instruction memory interface 250. The architecture 200 also comprises an NFA engine 220. The NFA engine 220 is connected to an instruction cache 240 which also may be an L1 cache. The instruction cache 240 for the NFA engine 220 accesses instructions from the instruction memory (not shown) via the instruction memory interface 250. The NFA engine 220 receives input symbols 205 from the same input stream (not shown) as the DFA engine 210. FIG. 1 shows an Event FIFO 260 and an LP Sorter 270 for processing signals from the DFA engine 210 to the NFA engine 220. A multiplexer 280 receives outputs (rule match information) from both the DFA engine 210 and the NFA engine 220 and may output an output token 290 upon a successful match of a rule.

A typical rule can be logically divided into a beginning, or entrance fragment, matched by the DFA engine 210 and a trailing or tail fragment typically matched by the NFA engine 220. The DFA engine 210, after matching an entrance fragment, will signal to the NFA engine 220 indicating an entrance NFA state which should be activated to continue matching the rule. The signal may include a launch position in the input symbol stream where that entrance state should be activated. Normally this position will be after the last symbol of the entrance fragment matched by the DFA. When the NFA engine 220 reaches the indicated launch position, the entrance state is activated and continues matching the rule by detecting transition classes and activating next states in the NFA cell array. This will happen until an accepting state is reached and reports a full match of the rule, taking an action such as generating a token. The entrance fragment is assigned to the DFA engine 210 by a DFA/NFA compiler (not shown) such that it is a DFA friendly fragment. This may mean that it a relatively simple rule fragment, matching a relatively short maximum length, such as 8 or 64 symbols, but which is not extremely short, such as 1 or 2 symbols. The fragment may also be relatively narrow as to symbol classes (character classes not matching many symbols, such as [abcd]). The fragment may also be at or near the beginning of the rule.

For example, the regular expression "abc.*def*ghi" can be used to illustrate a fragment methodology embodiment of the invention. In the expression, '.*' matches any number of symbols of any type. A DFA entrance fragment may then be "abc". The first '.*' will not be included in the DFA fragment because it can match any length and using just "a" or "ab" would be too short, leaving 'c' either by itself or combined with a potentially lengthy '.*'. Nothing is added by this. Accordingly, the DFA is configured by the compiler to match the fragment "abc". It is understood that additional rules may be configured into the DFA. The NFA is configured to match the remainder, or tail fragment, of the rule, ".*def.*ghi". "Fragment" accordingly means a portion of a rule whether it is an entrance fragment or a tail fragment. Moreover, in situations where a DFA or an NFA is suited to match an entire rule, a fragment may be the entire rule. When the DFA matches 'abc' somewhere in the input stream, it will signal to the NFA to launch an entrance NFA state such as a state matching ".*d". This state will be activated in the NFA cell array at the input position after the 'c' in "abc", so it is able to match 'd' at the next symbol position, or later (according to the '.*' possible indeterminate matches). When it matches 'd', it transitions to a next state in the cell array, for example matching 'e', and so forth, until a final state matches 'i' and generates a token. The DFA instructions indicating successful matches in DFA accepting states can include a flag or code to indicate the proper action for each match. A DFA instruction may contain a token ID to output for a whole rule match. When an entrance fragment match is indicated, the same token ID field can contain a reference to the NFA state to be activated. This may be the address of the first instruction for the NFA state and a number of instructions in the NFA state.

Some rules, such as rules with complex beginnings, wide symbol classes or large quantifiers near the beginning of the rule, may be matched entirely by the NFA. The compiler will not assign a beginning fragment to the DFA. These rules may be essentially rules where no appropriate DFA entrance fragment is present. For example, the rule "[a-z].*123" may be assigned entirely to the NFA because "[a-z] is not an appropriate DFA entrance fragment. It matches too easily, thus putting an undesirable burden of work on the DFA engine and generating an undesirable frequency of entrance state signals into the NFA.

Matching a whole rule requires the NFA cell array to contain a corresponding start state matching "[a-z]", which is active at the beginning of the scan and may remain active during the entire scan. An NFA start state could match "[a-z]" and then transition to a next state matching ".*1". If the NFA engine 220 is a statically configurable cell array, start states may be configured directly into the array before scanning. If it is dynamically reconfigurable, then the DFA engine 210 may signal the NFA engine 220 at the beginning of each scan to activate the necessary start states. The NFA engine 220 may also be configured with a list of start states to activate at the beginning of each scan. Since signaling NFA state activations may be a function of the DFA engine 210, it may also function to activate start states.

By having the DFA engine 210 function to signal to activate start states, the NFA cell array begins each scan empty. By empty, it is meant that there are no active states. The NFA cell array waits for the DFA to signal NFA state activation. This puts the DFA engine 210 in full control of the scan. The NFA engine 220 will match only in response to the DFA engine's 210 signals. For example, the DFA engine 210 may be constructed to be configurable to match using multiple DFAs, corresponding to multiple groups of rules, where a scan command indicates which rule group should be used to scan a particular stream. The DFA engine 210 can then signal to activate NFA start states corresponding to the selected rule group by accessing start-of-scan instructions stored with the associated DFA and by executing that DFA. The DFA engine 210 will match entrances and signal NFA entrance state activations corresponding to the selected rule group. Resultantly, the NFA engine 220 will respond by activating states and finding matches corresponding to the selected rule group.

The DFA engine 210 may find numerous entrance matches rapidly and generate the next entrance state launch signal to the NFA engine 220 without waiting for the NFA engine 220 to process the previous signal. As noted, the DFA will be unaware of the state of the NFA since communication flows predominantly in one direction. The signals may be stored as entrance events in a buffer or queue which the NFA engine 220 will be enabled to access. Each entrance event will comprise a reference to the NFA state to be activated and a launch position in the symbol stream where it should be activated. This may be such as the position after the last symbol in the entrance fragment match. The entrance events may be sorted into order of increasing launch positions before the NFA engine 220 processes them. This way they can be processed in an order to activate their corresponding NFA states at increasing symbol positions. Such sorting may be accomplished by a Launch Position Sorter (LPS) 270 module situated between the DFA engine 210 and the NFA engine 220. Though the LPS is shown in FIG. 2, it is understood that the module may also be part of either the DFA engine 210 or the NFA engine 220. The DFA engine 210 writes events with launch positions into the LPS 270 and the NFA engine 220 will read events from the LPS 270. As noted, these may be accessed in increasing order of launch position.

Many sorter architectures are appropriate. For example, the LPS 270 can have a sliding window of launch position bins. Each bin would contain some number of events with the corresponding launch position, or each bit could contain a pointer into a linked list of events with the corresponding launch position. A sliding window of fixed size may be adequate, such as 128 symbol positions, assuming that DFA entrance fragments are restricted to some shorter length, such as 64 symbols. The left edge of the sliding window would be determined by the read position of the NFA engine 220 and the DFA engine 210 may not progress so far ahead that it overwrites the right edge of the sliding window. However, to permit the DFA engine 110 to scan further ahead that the LPS window length, the DFA engine 210 can write events into a FIFO 260 of some predetermined capacity such as 256 events. These would transfer from a read side of the FIFO 260 into the LPS 270 whenever they did not transgress the right edge of the sliding window. The DFA engine 110 may scan arbitrarily far ahead of the NFA engine 220 until the event FIFO 260 becomes full. The LPS 270 can be designed to automatically output an event of the next lowest launch position each time the NFA engine 220 accesses it, such as by transferring events from the first occupied bin within the sliding window or from the linked list accessed through than bin.

When the NFA engine 220 reads entrance events from the LPS 270, it will need to activate the referenced state at the indicated launch position. In the case of a dynamically reconfigurable NFA cell array, the NFA engine 220 will load the referenced state in at least one cell of the array. The needed state may not already be present, which may occur since the state is for a rule just beginning to match and may not have been used recently. If the state is already present in the NFA cell array then the NFA engine 220 will not need to load that state. To load a state into a cell(s), one or more instructions corresponding to the state will be accessed from au instruction memory or cache. If it is a cache, it is not unlikely that there may be a cache miss. This may occur because the rule may not have been matched recently. Due to the fact that the NFA lags the DFA by a number of symbols, there is time to resolve the cache miss by filling referenced instructions into the cache. Accordingly, when a cache 240 is used for NFA instructions, the NFA engine 220 will read events from the LPS 270 as soon as possible without waiting until the NFA engine 220 scan approaches the launch position. This is so as to have more time to resolve any cache misses. After the instructions for the state are retrieved from the memory or cache, they can be loaded into one or more cells in the cell array as required or indicated by those instructions. The cells can be configured earlier, in background, rather than waiting until the cell array reaches the launch position. The cells, however, should not be configured too earlier to avoid too many cells being occupied with inactive states waiting to activate. Accordingly, the NFA engine 120 may wait until a reasonable time before the launch position. This may be, for example, 16 symbols prior to the commencement of loading the state using its instructions. To support early instruction cache access but delayed sate loading, the retrieved instructions may be held in a queue waiting for their time to load.

Once the target state is present in the NFA cell array (statically or dynamically configurable), it needs to be activated at the launch position indicated by the event. Each NFA cell may contain a launch timer which can be programmed in the background before the launch position is reached. The timer will wait until the launch position is reached and then autonomously activate the cell. In this manner, the entire action of the event can be applied to the cell(s) with the target state in advance in the background and no other actions need to be performed at the launch position. This may aid in minimizing stalls that would ensue for taking actions exactly at the lunch position.

The HFA architecture, in which a DFA engine 210 matches rule entrance fragments, and an NFA engine 220 activates corresponding entrance states and matches the remainders of the rules, leverages strength of both DFA 210 and NFA engines 220. It also compensates for any weakness that may be part of either type of engine. In the HFA, the DFA portion is only assigned simple entrances and simple whole rules to minimize state explosion. It is understood that the term simple is relative and a compiler can vary in its assignations of fragments to DFAs. Further, the DFA is assigned relatively short fragments and rules. Again, it is understood that the term short is relative and a compiler can vary in its assignations of fragments to the DFAs. The DFA will match the entrances of most rules, which correspond to the most frequent active NFA states if an NFA engine is used without DFA assistance. In other words, the most frequent active NFA states are those that are at the beginning of rules. Accordingly, have the DFA match these portions will minimize the number of required active states in the NFA, thus leaving fewer active NFA states to track on average. The sub-expression level cooperation between DFAs and NFAs achieves good compensation between the weaknesses and strengths of DFAs and NFAs. The high scan speed of a multi-threaded DFA engine may be used to keep up with the NFA cell array speed.

An HFA compiler will configure the DFA and NFA instructions with instructions appropriate to cooperate in matching a given ruleset. The compiler may be constructed as follows: An NFA compiler will be used to translate a set of regular expressions or similar rules into an NFA. Then an algorithm is applied to cut the NFA graph into DFA portions adjacent to the root state(s) and remaining NFA portions. One possible algorithm is to make the cut a fixed distance from the root state, such as 4 transitions away but cut closer to the root prior to any NFA state with an alternative in-transition other than the path from the root, such as the self-transition in a '.*' state or prior to a transition with a symbol class wider than some threshold, such as 5 symbols. The DFA portion of the NFA graph is then transformed into an actual DFA by subset-construction algorithms. These treat each state with a cut-point transition as an accepting state which is used to generate an entrance event into the NFA state across the cut transition.

There may be different ideal splits in the HFA engine. The above described mechanism may be somewhat tunable by varying threshold numbers, fine granularity may also be difficult to achieve.

Rather than the rules being analyzed to split into DFA entrance fragments and NFA tails, the ruleset is first compiled into an NFA representation. The NFA is then analyzed to determine appropriate cut points. It is understood that the NFA may not be cleanly split at cut points into DFA and NFA portions, but various possibly overlapping entrance paths and tail portions may be identified, with entrance paths compiled into DFA instructions, and tail portions compiled into NFA instructions. The NFA can be optimized and thereby provide a stable methodology for rule splitting.

The NFA may be constructed by well-known methods. Those skilled in the art will readily understand NFA construction. Standard methods may involve the use of epsilon transitions (state transitions that are followed without consuming an input symbol). Epsilons are compatible with the method of this invention, merely by following them automatically by additional recursion without altering any calculations. They will not be considered because they can be removed by other well-known algorithms which is lends itself efficiently to hardware NFA engines. If the target NFA engine employs complex state cells, for example cells able to track a quantified symbol class ("spinner") followed by an out-transition symbol class such as "[a-z]{0,20}[123]", then the classical NFA states may be fit into complex NFA "super-states" before applying the methods of this invention. This may result in more accurate cost estimation using the methodology described herein. The NFA may also be optimized by well-known methods, such as combining parallel transitions or merging redundant states. In addition to improving HFA engine performance, an optimized NFA is closer to being a canonical representation, so that DFA-NFA splitting is more stable, thus giving consistent results independent of equivalent rule representation.

In a method of the invention, an intermediate "entrance ruleset" is generated, containing "entrance expressions", which are regular expressions representing paths from NFA start states to selected NFA "entrance states". Each entrance expression references its associated entrance state. When a simple rule is considered, there may often be a single entrance expression corresponding to the rule which matches or resembles a beginning portion of that rule. However, for more complex rules, there may be multiple associated entrance expressions representing various ways the rule can match a beginning sequence of symbols. Also, multiple rules may share a single associated entrance expression, such as multiple rules with identical or similar beginnings.

An entrance ruleset may then be compiled into a DFA by well-known algorithms for execution by the DFA engine. Accepting states of the DFA are configured to signal from the DFA engine to the NFA engine to activate their associated entrance states inside the NFA engine. The NFA engine may be configured to execute these entrance states when activated as well as all other NFA states reachable from those entrance states. When the entrance NFA state associated with a DFA accepting state is a terminal accepting state, for example if the entrance expression is an entire rule, the DFA accepting state may instead be configured to signal a match of the associated rule, without signaling to the NFA engine, thus implementing rules matched purely by the DFA engine. When an entrance expression is an empty or null expression, containing no symbol classes, the referenced entrance state must be an NFA start state which may be activated in the NFA engine at the beginning of each scan (with or without signaling from the DFA engine), thus implementing rules matched purely by the NFA engine.

For example, a linear sequence of NFA states such as A→B→C→D→E→F, derived from a simple rule, an entrance state such as state D may be chosen. The symbol classes for A→B→C→D transitions may then be written sequentially in the form of a regular expression, which is the associated entrance expression. For choosing a more preferable entrance state, a cost function can be defined. This cost function algorithm will evaluate the cost of choosing any given state as the entrance state for a branch of an NFA. The factors used in the cost analysis can be any factor that a user determines provides useful input to the algorithm. It is understood by those in the art that the range of cost factors is very broad. The state which minimizes the cost function is selected as the entrance state. If the start state (A) is selected as the entrance state, the entrance expression will accordingly be empty. This will result in a pure NFA engine matching for the example rule. If the terminal state (F) is selected as the entrance state, the entrance expression will be equivalent to the whole rule, resulting in pure DFA engine matching for the example rule.

Figure 3:
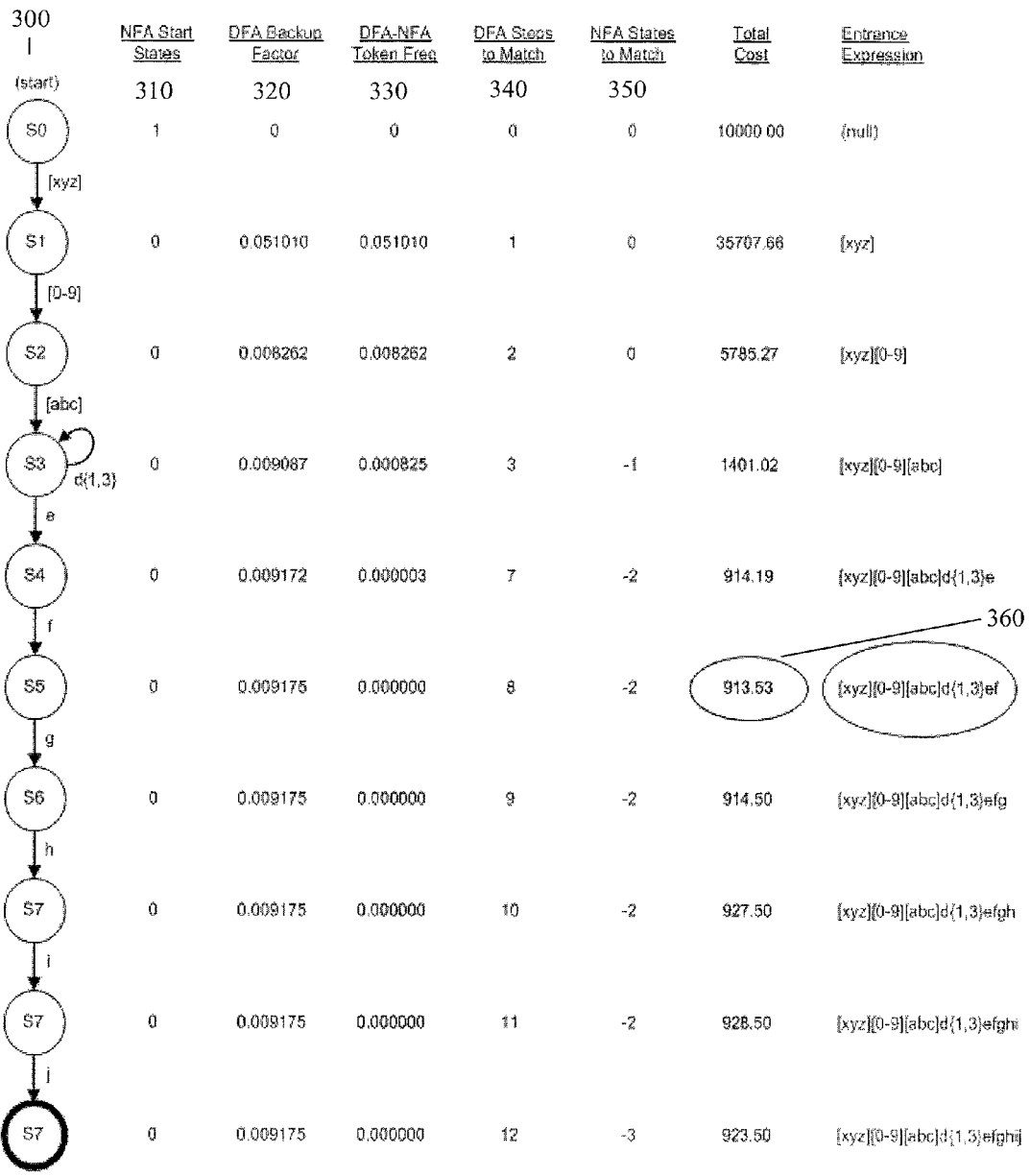
FIG. 3 is an embodiment of an NFA with cost factors calculated for each state.

In an embodiment of the invention, a cost function uses 5 cost components. These cost components are measured for any target candidate entrance state tested. FIG. 3 is an embodiment of an NFA with cost factors calculated for each state. The NFA 300 shows an NFA starting in the root state (S0) and descending to a matching state (S9). A first cost factor is "NFA start states" 310. This cost component will have a value of 1 if the target state is a start state, or 0 if the target state is not a start state. This cost component represents the impact of having a start state always active in the NFA engine, which will be the case if a start state is selected as an entrance state.

A second cost component is "DFA backup factor" 320. This component is the average length of each DFA descent if a DFA for the entrance expression for the target state is stimulated by arbitrary input symbols, realistic for the particular application but not deliberately matching the rule. This cost factor determines the work associated with the selected entrance expression in the form of state transitions executed. These may be estimated as an average descent depth. It is noted that the name "backup factor" derives from a DFA execution model in which, after each DFA descent, the scanner backs up to the symbol following the first symbol consumed, to look for a match starting at the next position. For example, if an entrance expression is "[a-z][a-z][a-z][a-z]", the backup factor may be close to 4 because the sequence of classes matches so easily and this means a correspondingly high burden of work for the DFA engine. To compute the "DFA backup factor" 320 cost component, a series of probabilities may be estimated for successfully matching up to each NFA state, from the start state to the target state. The probabilities are based on the width or content of the various transition symbol classes and decrease with each state because all previous classes must be matched before reaching the next class. Precise appropriate probability estimation methods vary by application. For example, if the input stream will be independent, uniform, random distributions of all possible symbols, then the probability of matching a single symbol class may be estimated by the number of symbols in the class divided by the total number of symbols existing and the probability of matching up to each state may be estimated as the product of the preceding symbol class match probabilities. For example, statistical factors in typical input streams may be considered. A 'q' followed by a 'u' may factor appropriately. The compiler may use simple statistics regarding typical frequencies for determining the costs. The estimated probabilities of matching through each symbol class may then be summed to obtain an estimated backup factor. The backup factor calculation may be modified to omit the first K estimated probabilities from the sum. For example, if K=1 or 2, then to represent the concept that given a full ruleset the DFA engine is likely to take K steps from the root state in most descents even without the current rule so backup factor up to that point is "free". The final estimated probability may not be omitted when in this range if signaling to the NFA engine requires an extra DFA engine step.

A third cost component is "DFA-NFA token frequency" 330. This is the cost component for the average number of signals (tokens) that would be sent from the DFA engine to the NFA engine per symbol position in the input stream, if a DFA for the entrance expression for the target state is stimulated by arbitrary input symbols. Equivalently, it is the probability of reaching the accepting state and emitting a DFA-NFA token on each DFA descent, so it is expressed as a value between 0.0 and 1.0. This cost component may be considered relevant because each DFA-NFA token uses limited system resources, such as the path to access NFA instructions and load or activate NFA states. If DFA-NFA tokens are too frequent, performance may bottleneck. For example, if an entrance expression is "[a-z]", the DFA-NFA token frequency may be very high, such as 0.8 because that expression is easily matched. To compute DFA-NFA token frequency, a probability may be estimated for successfully matching through all NFA state transition symbol classes from the start state up to the target state, as described for the "DFA backup factor" 320 cost component.

A fourth cost component is "DFA steps to match" 340. This is an estimated number of state transition steps the DFA engine may take to descent all the way from the start state to the target state. If the states in the path are simple classical NFA states, this cost component is simply the number of states preceding the target state. If some state is a complex NFA "super-state", such as S3 matching "d{1,3} e" then its contribution may be high or not precisely defined (2 to 4 in this example). Either the highest or lowest value can be used. A medium value could also be used to provide a blending of the two numbers. This cost component provides relevant input for when a rule matches, or partially matches, when the DFA engine will do a corresponding amount of work.

A fifth cost component in FIG. 3 is "NFA states to match" 350. This is an estimate of the number of NFA states, beginning with the target state, which would be activated in the course of matching the rule. If complex NFA super-states are used by the NFA engine, as noted above, the number of super-states may be estimated. For example, if a super-state can match a string of multiple symbol classes, represented by a linear sequence of single-transition NFA states, then a compatible linear state sequence in the path from the start state to the target state may be counted once. If various super-state types have varying system cost, they may be given different weights in the count. The "NFA states to match" 350 cost component provides relevant input when a rule matches, or partially matches, and the NFA engine will do a corresponding amount of work by tracking the active states. Calculation of the "NFA states to match" 350 can be simplified (there may be varying numbers of states to match by varying paths in a complex NFA and long distances may remain in the NFA to final accepting states). Rather than counting states after the target state as a positive cost, the states before the target state may be counted as a negative cost. The states after the target state can be thereby ignored. This negative/positive switch provides a similar impact to the cost because the absolute cost value is what is being targeted. The difference between cost values at different target states is the value that matters for selecting a minimum cost entrance state, and whatever the true number of NFA states to match may be, this number decreases as longer DFA entrances are considered and more NFA states are left behind the target state.

The cost factors, five in the examples shown in FIG. 3, can be combined. To combine the five cost components into a single cost value, various methods may be used by those skilled in the art. One example is to multiply each component by a corresponding cost weight and sum the results. The cost weights can be chosen based on an expected impact of each cost component on the performance of the DFA-NFA hybrid engine. This adjusts the cost components into a comparable scale. It is understood that the weighting can be interpreted differently and is not absolute. For example, the first three cost components (NFA start states 310, DFA backup factor 320 and DFA-NFA token frequency 330) apply under arbitrary stimulus and typically have corresponding system limits. This is such that they are well tolerated without performance loss up to their limits. However, they degrade performance beyond their limits. Weights can be chosen to scale the corresponding limit values to the same cost contribution. The last two cost components (DFA steps to match 340 and NFA states to match 350) apply when rules fully or partially match and the relative impact of another step in the DFA engine related to another state in the NFA engine may be compared, with weights chosen to scale equivalent impacts to equivalent cost contributions. Scaling between the first three and last two cost components may be accomplished by estimating the frequency at which a typical single rule will match or partially match in the target application. The weights for "DFA backup factor" 320 and "DFA steps to match" 340 may be in a ratio equal to this estimated rule match frequency. The weights for "DFA-NFA token frequency" 330 and "NFA states to match" 360 may be in the same ratio. For example, total cost calculation using weights for one HFA engine embodiment and target application may be: (1,000×NFA start states×10)+(100,000×DFA backup factor×20)+(600,000× DFA-NFA token frequency×30)+(1×DFA steps to match× 50)+(6×NFA states to match×60).

The cost value may thus be calculated for each target state in a linear state path from a start state and the target state with lowest cost may be selected as an entrance state. In the example used in FIG. 3, the lowest target state cost is S5 with a lowest cost of 913.53 360. The entrance expression for S5 would accordingly be "[xyz][0-9][abc]d{1,3}ef". The state path from the start state to the entrance state is the associated entrance path, which may be represented by an entrance expression, written to the entrance ruleset, to be compiled for the DFA engine.

Figure 4:
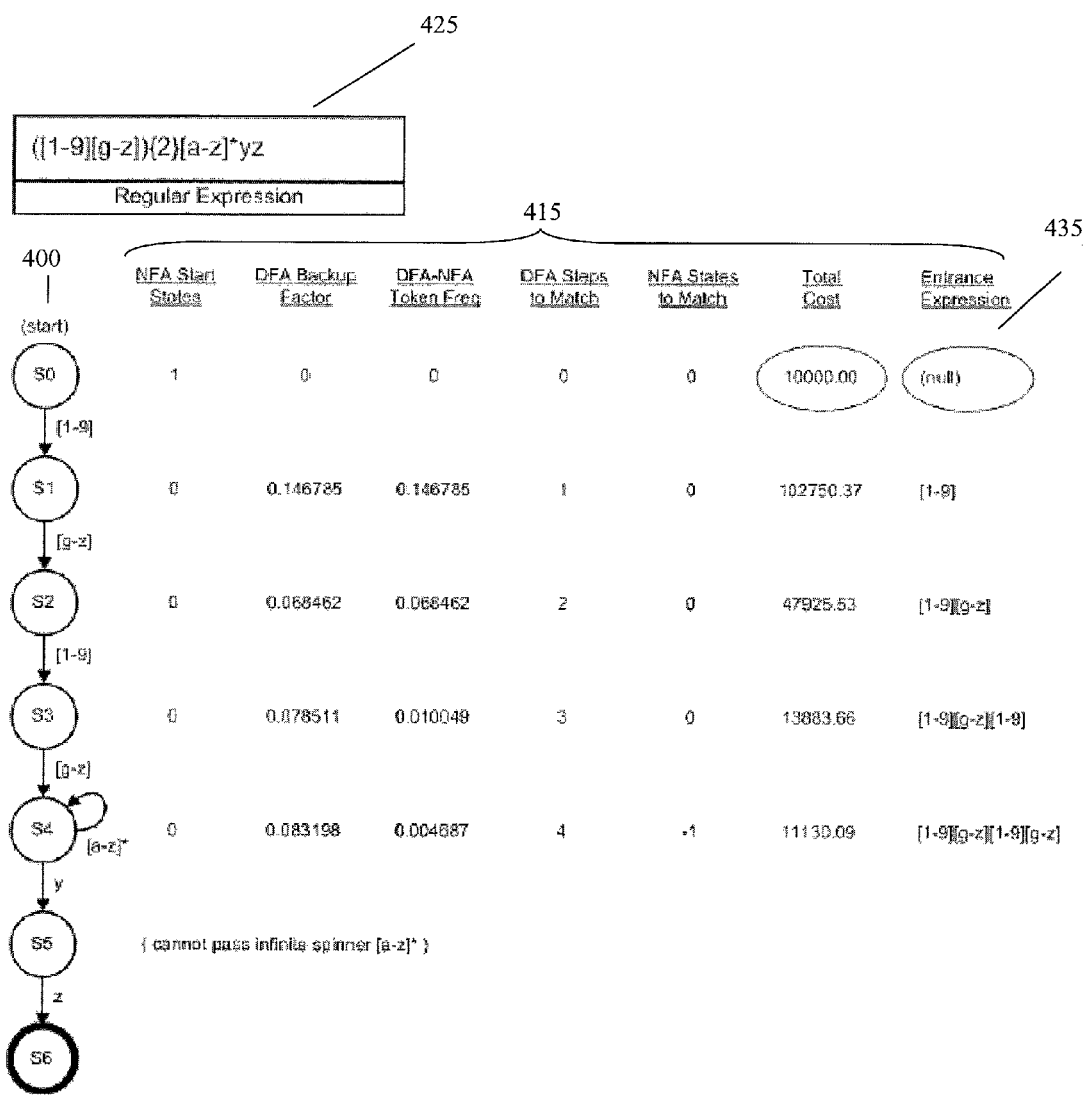
FIG. 4 is an embodiment of an NFA with cost factors calculated for each state and with the minimum score at the start state.

FIG. 4 is an embodiment of an NFA with cost factors calculated for each state and with the minimum score at the start state. Similar to FIG. 3, an NFA 400 is shown starting in a root state (S0) and descending to a matching state (S6). A same set of cost factors 415 are used to determine the entrance fragment. The start state cost of S0 is 10000 with a null entrance expression 425. The rule 425 used in FIG. 4 has wide initial classes of [1-9] and [g-z]. These initial classes cause a high DFA backup factor in states S1 through S4. This high DFA backup factor causes the total cost to well exceed the start state cost in states S1 through S4. Further costs cannot be considered past state S4 due to the spinner [a-z]*. Accordingly, the global minimum cost is 10000 at S0, with a null entrance expression 425. Due to the start state having the lowest cost, start state S0 should be programmed into the NFA engine as a start state and the rule will be matched entirely in the NFA. Although this may be an expensive result, 10,000, it is cheaper than the backup factor in states S1 through S4 and the token frequency that would result from any entrance fragment that might be assigned to the DFA engine. It is understood that the cost factors are combined in the same manner as that of FIG. 3.

Figure 5:
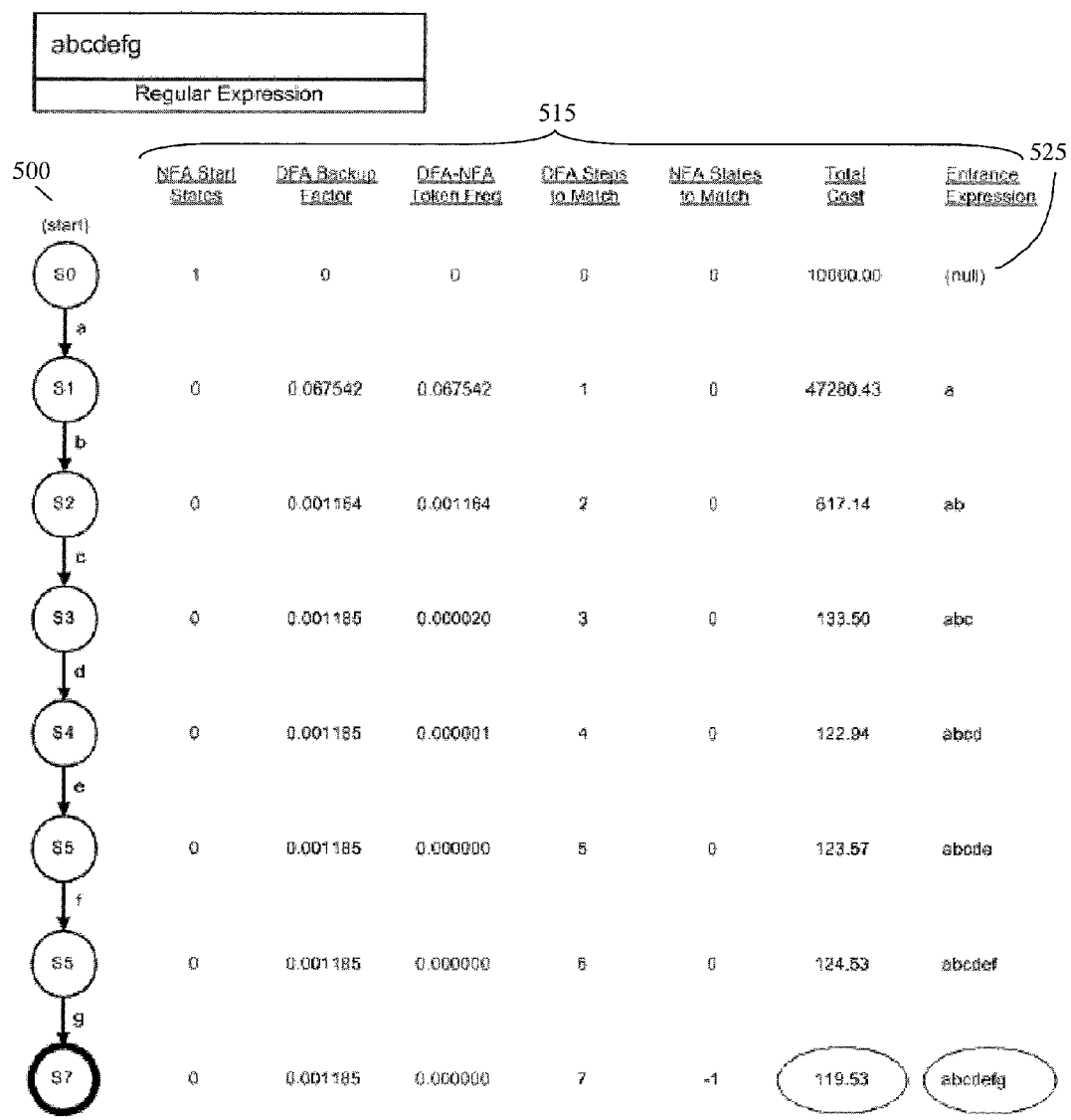
FIG. 5 is an embodiment of an NFA with cost factors calculated for each state and with the minimum score at the terminal state.

FIG. 5 is an embodiment of an NFA with cost factors calculated for each state and with the minimum score at the terminal state. Similar to FIG. 3 and FIG. 4, an NFA 500 is shown starting in a root state (S0) and descending to a matching state (S7). A same set of cost factors 515 are used to determine the entrance fragment. The start state cost of S0 is again 10000 with a null entrance expression 525. However, due to the progressive matching of [a], [b], [c], and [d] in states S1 through S4, which have low DFA backup factor costs and DFA-NFA token frequency costs, the cost factor stabilizes through state S4. Accordingly, S4 has a minimum local cost and "abcd" may be a reasonable entrance expression.

Continuing with FIG. 5, in states S5 through S6, the total cost increases due to increasing DFA steps to match, but NFA states to match does not decrease because any portion of the linear character sequence "abcdefg" can fit in one super-state. At the terminal accepting state S7, NFA states to match decreases from 0 to −1. This decrease to −1 reflects that if the DFA matches the whole rule, the character sequence super-state is no longer required in the NFA to match, and the total score decreases. Accordingly, terminal state S7 has the lowest score, 119.53. The entrance expression "abcdefg" is the whole rule, and the DFA engine will be programmed to match this rule without NFA involvement. It is understood that the cost factors are combined in the same manner as that of FIG. 3.

The foregoing discussion relates to choosing entrance states by minimizing a cost function along a linear NFA graph. It is understood, however, that the actual NFA for a given ruleset may not be a linear state path. Recursive analysis can be used for non-linear state path issues. Beginning at each start state in the NFA, a depth-first recursive walk through the NFA can be performed. The recursive path will reach to maximum depth along one branch from the start state before backing up to follow another branch. The recursion may be limited to a maximum number of steps from the start state, corresponding to the maximum entrance length desired, such has 64, to avoid infinite recursion. A recursive function may be defined which his called with parameters of next state and next depth and returns a value which is either "covered" or "not covered". At a current state and depth, this function may recursively call itself with parameters of a destination state of a transition from the current state and the current depth plus one. To compute cost components and compare cost values, this function may be able to access its current recursive path through various states from the start state, as well as the history of total costs computed at each state on that path. For example, this may be done by pushing a new state and cost information onto a stack at each stage of recursion, popping entries from the stack whenever the function returns, and reading the stack from within the function as needed.

When a recursive function is called on a current state and depth, it may first compute the cost components and total cost value for potentially selecting the current state as an entrance state, using the recursive path to this state from the start state as the entrance path. Cost components at the current state may be computed incrementally from cost components at the previous state to save computation time. Current state and cost information may be saved on a stack for access during deeper recursion. Then, if the current depth is not the maximum depth, and the current state is not an accepting state, the function may recursively call itself on the destination state of each out-transition from the current state and examine the return values. If all return values are "covered", then longer entrances have already been selected and the current function call simply returns "covered" as well. In all other cases (at maximum depth, at an accepting state, or an out-transition not covered) an entrance must still be chosen. The current cost is compared with cost values for previous positions in the recursive path. If the current cost is the minimum cost, then the function selects the current state as an entrance state, generates an entrance expression corresponding to the recursive path to this state, to it to the entrance ruleset along with a reference to the entrance (current) state and returns a "covered" value. If the current cost is not the minimum cost, then the function returns an "uncovered" value.

When the recursive function called on a next state returns "covered", a "covered" flag should generally be applied to that next stated as well as to the state transition the function call was made through if it was a recursive call. Such covered flags can be later used to delete states and transitions needed only for entrance paths. But entrance states themselves should not be flagged as covered. If any state in the recursive path to the transition or next state has an alternative in-transition not involved in the recursive path itself, then the transition or next state will not be flagged "covered" because they may be needed for matching activity other than entrance paths.

The recursive function can be called once on each NFA start state, at a starting depth of zero, from which it will search deeper for entrances. By this recursive technique, various recursive paths from each start state can be examined as linear state paths, from which entrance state will be chosen. Optimizations may be applied to the recursive function. Though recursion to a depth such as 64 is possible, the current cost components in comparison with the minimum cost seen on the entrance path so far can be examined and determine whether it is very likely, or unlikely, that a new minimum will be found by deeper recursion. If so, the recursion can be exited early. The first three cost components in FIG. 3 tend to stabilize to near-constant values after the estimated probability of penetrating the NFA to the current depth becomes very small. After this happens, only the increasing "DFA steps to match" 350 and decreasing "NFA states to match" 360 remain changing. If the current cost is substantially higher than the minimum cost, it may be judged very unlikely to recover.

Another optimization is that loops in the NFA may be penalized during recursion. If the same state has been visited more than once in the recursive path, then passing it should only decrease "NFA states to match" 360 once, or perhaps not at all, because the state apparently may be activated by the NFA engine subsequent to an entrance state beyond it. This cost penalty can then lead to an early exit, rather than following the same loop repeatedly to maximum depth. Alternatively, recursion can be terminated automatically if the same state is seen twice.

Another optimization is that recursion may be terminated at any state transitioning to itself, or a complex super-state comprising an infinite "spinner" such as "[a-z]*". This type of state is very inefficient for DFA engine matching and limited-depth recursion cannot get cleanly past it. So, typically, it may be preferable to select an earlier entrance and leave it to the NFA engine. Similarly, if a spinner super-state is encountered with a high finite maximum spin value, such as "[a-z] {0,100}, recursion can terminate. A spinner with small maximum, such as "[a-z] {3,5}" can be traversed by the recursion, with appropriate cost component updates, such as "DFA steps to match" 350 increased by the spin maximum and "DFA backup factor" 320 and "DFA-NFA token frequency"330 adjusted for multiple symbol class transitions.

Another optimization is that each NFA state visited during recursion may have an associated counter incremented, and recursion may terminate at any state where the counter exceeds a limit value, such as 100, which could happen in a complex NFA graph with many possible recursive paths to reach the state. By terminating recursion early in such a case, exponential growth in search time can be prevented.

After completing the recursion through Each NFA start state, the NFA will have various states selected as entrance states. The entrance ruleset will contain entrance expressions associated with those entrance states. The entrance ruleset can be compiled into a DFA with accepting states configured to signal from the DFA engine to the NFA engine to activate the associated NFA entrance states inside the NFA engine. Other states of the NFA may also be executed by the NFA engine, but portions which are only needed to implement entrance paths may be deleted to reduce and simplify the states remaining for the NFA engine. Specifically, any state or transition flagged "covered" by the recursive search may be deleted from the NFA before encoding into instructions for the NFA engine.

In a complex NFA, some NFA states may be used in entrance expressions, but may be reachable from other entrance states. Thus, some original NFA states may contribute to the DFA executed by the DFA engine, but also sometimes be tracked by the NFA engine. While this may be duplicative, it does not provide extreme inefficiencies. For example, for the expression "a(12)?bcdefghijk.*xyz", selected entrances may be "abcd" and "a12b". The "abcd" path passes through the entrance state of the "a12b" path. If a DFA is constructed directly from the entrance-only portion of this NFA, the DFA engine will reach an accepting state to signal the NFA engine after just "ab", which is generally too short to be effective as an entrance. The earlier accepting state may be removed, extending the latter entrance to "a12bcd". However, this entrance is not optimal. Thus, to compile the DFA straight from the entrance portions of the original NFA, without intermediate generation of entrance expressions, one of the suboptimal options is chosen. DFA construction methodologies can be altered to obtain the same results as using entrance expressions.

One possible way to alter DFA construction is as follows: Each NFA state and transition on any entrance path may be labeled with a list of entrance path IDs corresponding to all selected entrance paths comprising that state. During subset construction on the labeled NFA states, each state with multiple IDs listed is treated as multiple states, with one variant for each ID and thus, each state may appear multiple times in each NFA state subset corresponding to a constructed DFA state. All ID variants of each start state are included in the subset for the DFA root state. When constructing DFA next states, each NFA state may transition only through NFA transitions with the same ID. An NFA state is considered an accepting state for DFA construction only if it is the entrance state for the entrance path corresponding to its ID. This adjusted subset construction scheme generates a DFA equivalent to the use of entrance expressions because it essentially operates on multiple entrance path NFA graphs, although by reference to a single master NFA graph.

An embodiment of this invention extends each rule entrance path to an optimal length in the DFA by selecting the length that minimizes the total impact of multiple cost components. Three cost components, "NFA start states", "DFA-NFA token frequency" and "NFA states to match", decrease as the entrance length grows, and therefore push the entrance choice longer. Two cost components, "DFA backup factor" and "DFA steps to match" generally increase as the entrance length grows and therefore pull the entrance choice shorter. The optimal length occurs where these competing forces balance. The "NFA start states" component matters for the step from a null entrance to a 1-step entrance, pushing to generate some 1+ step entrance unless all have very high costs. Typically, the "DFA-NFA token frequency" and "DFA backup factor" components dominate for short entrances, such as 1 to 4 steps, but their contribution gradients decrease rapidly and after several steps the "DFA steps to match" and "NFA states to match" components are left to compete.

Embodiments of methods and systems of this invention are tunable by altering the cost component weights. If a particular cost component is overly prominent at scan time, such as the DFA engine slowing down because its backup factor is too high, then the corresponding weight may be increased. If a particular cost factor has great room to spare at scan time, then the corresponding weight may be decreased.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of splitting an automaton into a DFA portion and an NFA portion, the method comprising:
    compiling a ruleset into an NFA representation;
    analyzing said NFA to determine entrance paths for matching by a DFA engine and tail portions for matching by an NFA engine, said entrance paths and tail portions covering a whole NFA; and
    compiling said entrance paths into a DFA for execution by a DFA engine, wherein accepting states of said DFA are configured to signal from said DFA engine to an NFA engine to activate associated tail portion entrance states inside said NFA engine;

wherein said process of analyzing comprises evaluating a cost function, said cost function comprising a plurality of factors, said plurality of factors comprising NFA start states, DFA backup factor, DFA-NFA token frequency, DFA steps to match, and NFA states to match.

2. The method of claim 1, wherein the step of compiling an entrance ruleset into a DFA comprises:

generating entrance expressions corresponding to said determined entrance paths;

compiling said entrance expressions into an entrance NFA; and compiling, by subset construction, said entrance NFA into said DFA for execution by said DFA engine.

3. The method of claim 1, wherein said step of compiling an entrance ruleset into a DFA comprises:

labeling each NFA state and transition on any entrance path with a list of entrance path IDs which correspond to all determined entrance paths traversing said NFA state;

treating each state with multiple IDs listed as multiple states during subset construction with one variant for each ID;

including all ID variants of each start state in the subset for a DFA root state; and when constructing DFA next states, limiting NFA transitions so that each NFA state may transition only through NFA transitions with the same ID.

4. The method of claim 1, wherein said plurality of factors are summed in the cost function.

5. The method of claim 1, wherein said plurality of factors are summed in the cost function and said plurality of factors are individually multiplied by a cost weight.

6. A method of splitting an automaton into a DFA portion and an NFA portion, the method comprising:

compiling a ruleset into an NFA representation;

analyzing said NFA to determine entrance paths for matching by a DFA engine and tail portions for matching by an NFA engine, said entrance paths and tail portions covering a whole NFA; and compiling said entrance paths into a DFA for execution by a DFA engine, wherein accepting states of said DFA are configured to signal from said DFA engine to an NFA engine to activate associated tail portion entrance states inside said NFA engine;

wherein said process of analyzing comprises:

evaluating a cost function, said cost function comprising a plurality of factors comprising NFA start states, DFA backup factor, DFA-NFA token frequency, DFA steps to match, and NFA states to match; and recursively analyzing said NFA, wherein entrance paths are examined in depth first order, and selected when the cost function values are lower than cost function values for shorter and longer entrance paths.

7. The method of claim 6, wherein said step of compiling an entrance ruleset into a DFA comprises:

generating entrance expressions corresponding to said selected entrance paths;

compiling said entrance expressions into an entrance NFA; and compiling by subset construction said entrance NFA into said DFA for execution by a DFA engine.

8. The method of claim 6, wherein said plurality of factors are summed in the cost function.

9. The method of claim 6, wherein said plurality of factors are summed in said cost function and said plurality of factors are individually multiplied by a cost weight.

* * * * *